Nov. 8, 1932.  V. PUC  1,887,466
PRESS FASTENER
Filed Jan. 9, 1931
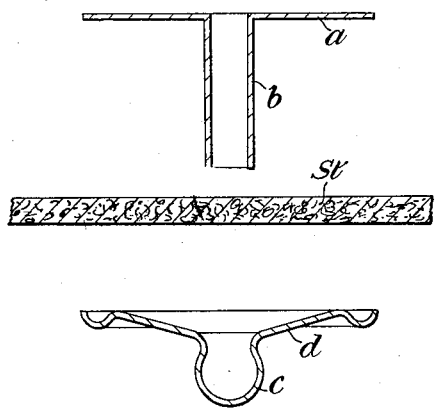
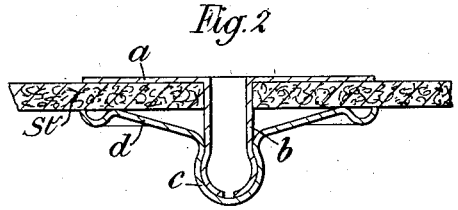
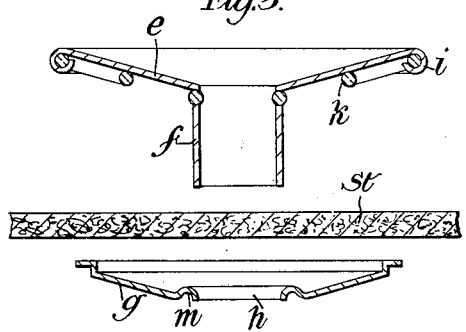
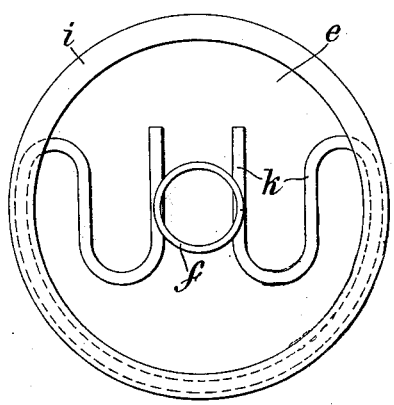
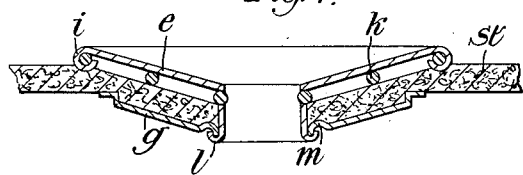
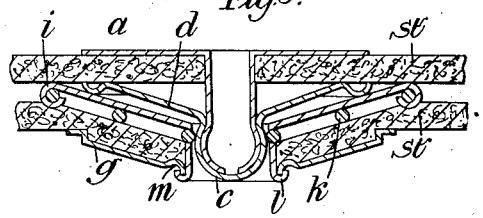
V. Puc
INVENTOR
By: Marks & Clerk
Attys Patented Nov. 8, 1932

1,887,466

UNITED STATES PATENT OFFICE

VOJTECH PUC, OF PRAGUE, CZECHOSLOVAKIA

PRESS FASTENER

Application filed January 9, 1931, Serial No. 507,664, and in Germany February 3, 1930.

Press fasteners for various purposes, for example for clothing for fancy goods and the like, are known in which the disc holding the closing spring is made concave or cup shaped or in the shape of a part of a hollow cone. This construction has the advantage that the introduction of the head (or the ball) of the other part of the press fastener into the opening is facilitated and at the same time by depressing the concave or cup shaped or conical disc surface the whole spring element of the press fastener scarcely projects above the surface of the material.

In this known kind of press fasteners the following arrangements are made according to the invention.

(a) The arrangement that the ball of the lower element of the press fastener is mounted at the centre or at the point of a convex or conical disc, the elevation of which corresponds to the depression of the counter disc of the upper element.

(b) The arrangement that the upper element (spring element) of the press fastener has a central hollow rivet at the base of which are the slots which receive the limbs of the spring, while the other end which is forced through the material is beaded over into the annular groove of a cup-like or conical plate in order to form a riveted joint.

Protection is sought not only for the combination of the arrangements referred to under $a$ and $b$ but also for each arrangement itself as far as it is new.

By the arrangement according to $a$, it is achieved in the manner by which the two elements are very closely jointed together on account of fitting entirely one within the other; that is, spreading and gapping is prevented. Apart from the fact that with the construction of the ball element, according to the invention, the insertion of the ball into the opening is made much easier, the fastener is mounted more securely and the ball element is strengthened on account of the new shape.

Since according to the arrangement described in $b$, the spring element of the fastener is secured to the material by means of a cup shaped or conical rivet disc, the material is not only tightly gripped between the two parts of the spring element of the fastener but at the same time mobility of the closing spring is not affected.

The invention is further described with reference to the accompanying drawing.

Fig. 1 shows in vertical section the two parts of which the lower element of the press fastener consists together with the material which is gripped between the two parts.

Fig. 2 shows the two parts of the lower element joined together.

Fig. 3 shows the two parts of the spring element of the fastener with the material which is to be gripped between the parts.

Fig. 3a is an inverted plan of the upper part of the spring element.

Fig. 4 shows the two parts of the spring element of the fastener joined together.

Fig. 5 shows the whole press fastener when closed. The lower element of the fastener consists of the disc $a$ with the hollow rivet $b$ and the head (ball) $c$ which is attached at the apex of a hollow cone $d$. When the parts are joined together the hollow rivet is forced through the material $St$; the end of the rivet enters the hollow space of the ball $c$ and here is spread out in a known manner by riveting, in order to produce a secure connection and to fasten the ball element onto the material $St$.

The spring element of the fastener consists of the cup-like disc $e$ with the hollow rivet $f$ and the counter disc $g$ also cup shaped with an opening $h$ in the middle. The disc $e$ is beaded over at the edge $i$ and in the beading is placed the semi-circular portion of the spring $k$, the other limbs of which are placed in a known manner in the slots which are provided at the base of the hollow rivet $f$.

When the two parts are joined together, the hollow rivet $f$ is forced through the material $St$. The end of the hollow rivet which then passes through the opening $h$ of the counter disc $g$, as shown in Fig. 4, is beaded over and the beading $l$ lies in a groove $m$ running around the disc $g$.

The hollow cone $d$ of the whole element of the fastener is closely fitted to the cup shaped hollow cone $e$ of the spring element. Consequently the two elements which are related like a matrix and patrix lie completely one within the other in the manner shown in Fig. 5, the construction of the ball element having facilitated the insertion of the ball in the opening of the spring element.

The two parts of the material $St$ can in this manner be brought very closely together, the extremely stable press fastener having a secure mounting without limiting in any way the play of the spring $k$.

What I claim is:

1. A press fastener comprising a lower element formed of a disc raised at the centre and a spherical member at the centre of the disc, and an upper element comprising a disc raised at the centre, a hollow rivet at the centre of the disc adapted to pass through the material to which the upper element is attached, a spring having limbs mounted at the base of the hollow rivet and a disc raised at the centre with a central hole, the hollow rivet passing first through the material and then through the hole in the disc, and being beaded over the edge of the hole.

2. A press fastener as claimed in claim 1, in which the discs of the upper and lower elements are conical.

3. A press fastener as claimed in claim 1, in which the discs of the upper and lower elements are cup shaped.

In testimony whereof I have signed my name to this specification.

VOJTECH PUC.